US009217374B2

(12) United States Patent
Beier

(10) Patent No.: US 9,217,374 B2
(45) Date of Patent: Dec. 22, 2015

(54) ASSEMBLY FOR A JET ENGINE OF AN AIRCRAFT

(75) Inventor: Juergen Beier, Schulzendorf (DE)

(73) Assignee: Rolls-Royce Deutschland Ltd & Co KG (DE)

(*) Notice: Subject to any disclaimer, the term of this patent is extended or adjusted under 35 U.S.C. 154(b) by 231 days.

(21) Appl. No.: 13/593,080

(22) Filed: Aug. 23, 2012

(65) Prior Publication Data

US 2014/0026592 A1    Jan. 30, 2014

(30) Foreign Application Priority Data

Sep. 2, 2011 (DE) .......................... 10 2011 112 253

(51) Int. Cl.
| | | |
|---|---|---|
| F02C 7/32 | (2006.01) | |
| F01D 25/20 | (2006.01) | |
| F02C 7/12 | (2006.01) | |
| F02C 7/22 | (2006.01) | |
| F02C 7/20 | (2006.01) | |

(52) U.S. Cl.
CPC . *F02C 7/32* (2013.01); *F01D 25/20* (2013.01); *F02C 7/12* (2013.01); *F02C 7/20* (2013.01); *F02C 7/22* (2013.01); *F05D 2250/311* (2013.01); *F05D 2250/312* (2013.01); *Y02T 50/671* (2013.01); *Y02T 50/675* (2013.01)

(58) Field of Classification Search
CPC .............. F01D 25/20; F02C 7/22; F02C 7/32; F02C 7/20; Y02T 50/671
USPC .............. 60/39.163, 734, 796–798, 801, 802
See application file for complete search history.

(56) References Cited

U.S. PATENT DOCUMENTS

| | | | | |
|---|---|---|---|---|
| 3,965,673 | A * | 6/1976 | Friedrich ......................... | 60/788 |
| 5,694,765 | A * | 12/1997 | Hield et al. .................. | 60/39.163 |
| 2006/0248900 | A1* | 11/2006 | Suciu et al. ..................... | 60/802 |
| 2007/0055435 | A1* | 3/2007 | Muramatsu et al. .......... | 701/100 |
| 2009/0223052 | A1* | 9/2009 | Chaudhry et al. ............ | 29/889.2 |
| 2009/0290976 | A1* | 11/2009 | Suciu et al. ................ | 415/122.1 |
| 2009/0313999 | A1* | 12/2009 | Hunter et al. ................... | 60/772 |
| 2010/0018182 | A1* | 1/2010 | Bader et al. ................ | 60/39.281 |
| 2010/0024434 | A1* | 2/2010 | Moore et al. .................... | 60/788 |
| 2010/0242496 | A1* | 9/2010 | Cass et al. ........................ | 60/802 |
| 2011/0011471 | A1* | 1/2011 | Voetter et al. ................. | 137/605 |
| 2011/0039250 | A1* | 2/2011 | Hunter et al. ................. | 434/401 |

FOREIGN PATENT DOCUMENTS

| | | |
|---|---|---|
| EP | 0540192 | 5/1993 |
| EP | 0540192 A1 * | 5/1993 |
| EP | 2123883 | 11/2009 |
| WO | 0079103 | 12/2000 |

(Continued)

OTHER PUBLICATIONS

German Search Report dated Jun. 27, 2012 from counterpart application.
European Search Report dated Feb. 7, 2013 from counterpart application.
Willy J. G. Braunling, Flugzeugtriebwerke, 2009, pp. 1322, 1323, 1363, 1365, 1368, 1378, 1386, Springer Dordrecht Heidelberg London New York.

* cited by examiner

*Primary Examiner* — Phutthiwat Wongwian
*Assistant Examiner* — Marc Amar
(74) *Attorney, Agent, or Firm* — Timothy J. Klima; Shuttleworth & Ingersoll, PLC

(57) ABSTRACT

The present invention proposes a structural unit for an aircraft engine having at least one fuel pump of a fuel circuit and at least one hydraulic fluid pump of a hydraulic fluid circuit, where the structural unit can be coupled to an accessory gearbox shaft of an accessory gearbox of the engine.

14 Claims, 3 Drawing Sheets

ASSEMBLY FOR A JET ENGINE OF AN AIRCRAFT

Figure 1:
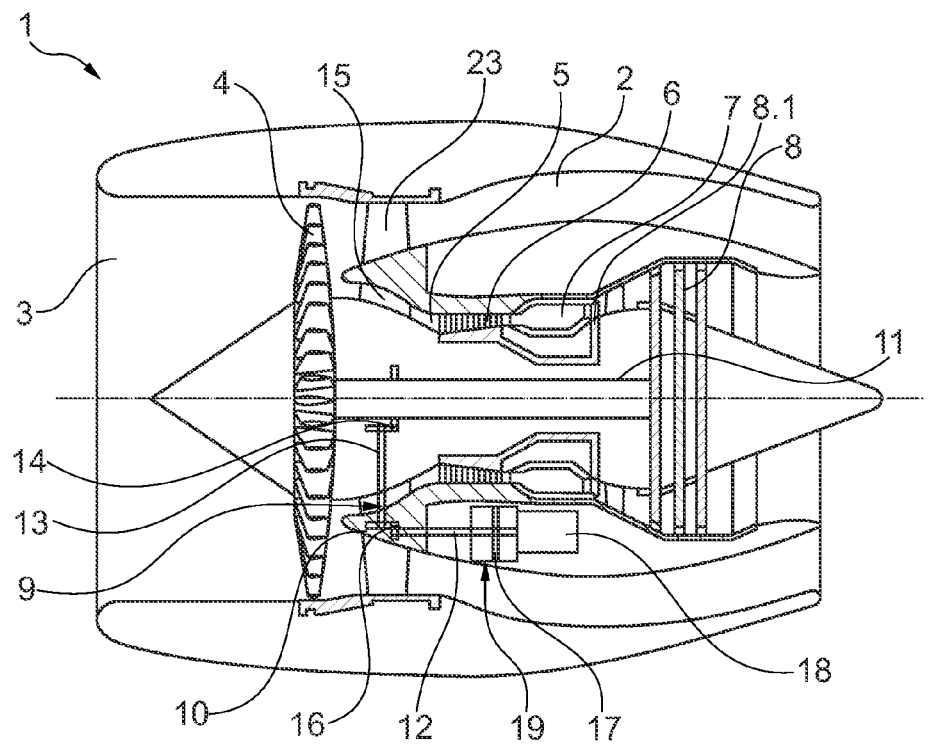

This application claims priority to German Patent Application
DE 102011112253.6 filed Sep. 2, 2011, the entirety of which is incorporated by reference herein.

This invention relates to a structural unit for an aircraft engine in accordance with the type defined in greater detail herein.

Known engines for aircraft have a fuel circuit that passes fuel by means of fuel pumps from a fuel tank to combustion chambers, and a separate lubrication oil system with an oil tank and an oil filter by which oil is conveyed by oil pumps for lubrication and cooling of the main engine bearings and of the bearings and other moving parts of the accessory gearbox including the auxiliary units. A fuel pump, a bleed unit, a generator or the like can, for example, be employed as auxiliary units. The fuel circuit and the oil circuit are both routed to a heat exchanger, in order to heat the fuel regardless of the operating state, and at the same time to cool the oil of the oil circuit.

Conventionally, the fuel pumps and the oil pumps are coupled to an accessory gearbox driven by an engine shaft. The fuel pumps and the oil pumps interact here with separate accessory gearbox shafts which can be provided to drive further auxiliary units too, for example a bleed unit, a generator, a pneumatic starter or the like.

Accessory gearbox shafts of this type are arranged substantially parallel to the axis of one another and are adapted to the available installation space inside the engine. They are here positioned substantially adjacent to one another and spread in the circumferential direction of the engine, and they are driven via spur gear stages by an accessory gearbox drive shaft operatively connected to the engine shaft.

The auxiliary units are each arranged on a separate accessory gearbox shaft of the accessory gearbox and are for example connectable by bolt connections to a casing of the accessory gearboxes, where the accessory gearbox disadvantageously requires a large installation space and is characterized by a high overall weight due to the large number of accessory gearbox shafts needed.

The object underlying the present invention is to provide a structural unit for an engine in which the arrangement of auxiliary units on an accessory gearbox is improved such that an engine favourable in terms of installation space and having a low overall weight can be provided.

It is a particular object of the present invention to provide solution to the above issues by a structural unit for an aircraft engine in accordance with features described herein.

A structural unit is proposed for an aircraft engine, in particular a jet engine, having at least one fuel pump of a fuel circuit and at least one hydraulic fluid pump of a hydraulic fluid circuit, where the structural unit can be coupled to an accessory gearbox shaft of an accessory gearbox of the engine.

The solution in accordance with the invention has the advantage that due to the structural unit several pumps that can in conventional engines each be coupled to a separate accessory gearbox shaft can be coupled to a single common accessory gearbox shaft. Compared with known accessory gearboxes, in which fuel pumps and hydraulic fluid pumps are arranged on separate accessory gearbox shafts, it is possible with a structural unit in accordance with the invention to reduce the number of accessory gearbox shafts. By leaving out at least one accessory gearbox shaft and the corresponding gears, installation space and weight are advantageously saved, so that the costs of an entire engine too can be reduced with the solution in accordance with the invention.

Furthermore, the length of an accessory gearbox interacting with the structural unit in accordance with the invention can be advantageously reduced by dispensing with at least one accessory gearbox shaft in the circumferential direction of the engine, so that the complexity of supply lines inside the now shortenable accessory gearbox is reduced in turn.

The working time needed for assembly of the engine is also shortened by the solution in accordance with the invention, as fewer parts have to be installed.

In an advantageous embodiment of a structural unit in accordance with the invention, the at least one fuel pump and the at least one hydraulic fluid pump are arranged inside a common casing. This measure in turn allows weight and cost savings.

If a high-pressure fuel pump and a low-pressure fuel pump are provided which are arranged on a common shaft of the structural unit, an installation space required by said structural unit in the radial direction can be very small.

An alternative or additional possibility for reducing the structural unit installation space facing in the radial direction is that a hydraulic fluid delivery pump and at least one hydraulic fluid return pump are provided which are arranged on a common shaft of the structural unit. This shaft then runs in particular parallel to the shaft on which the fuel pumps are arranged.

In an alternative embodiment of the invention to the above, an oil delivery pump and at least one hydraulic fluid return pump can be provided which are arranged on separate shafts of the structural unit which in particular run parallel to one another. With this arrangement, the hydraulic fluid delivery pump and the at least one hydraulic fluid return pump can be driven at different speeds by an appropriate coupling.

A coupling of the shafts of the structural unit is, in a simple embodiment of the invention, achieved by a gearbox of the structural unit in particular with at least one gear stage. The shafts can as a result be driven with a required gear transmission ratio to one another.

To couple the structural unit in a simple manner to an accessory gearbox shaft of the accessory gearbox, the gearbox has in an advantageous embodiment a shaft area that can be coupled to an accessory gearbox shaft and is designed in particular with external teeth. The shaft area can in particular interact with a hollow shaft of the accessory gearbox which has internal teeth corresponding to the external teeth.

In a preferred embodiment of the invention, a heat exchanger forms part of the structural unit and is in particular integrated into the casing of the structural unit. Due to the proximity of the heat exchanger to the pumps, a length of the lines connecting the heat exchanger to the pumps is greatly reduced in comparison with known solutions where pumps and heat exchangers are arranged separately from one another, and the lines connecting the pumps to the heat exchanger can be integrated into the structural unit, thereby keeping an installation space required by the structural unit very small. In addition, an embodiment of this type of the structural unit in accordance with the invention has the advantage that the entire structural unit with the pumps and the heat exchanger can be removed from the accessory gearbox shaft in its entirety, for example to carry out maintenance and repair work, and also arranged thereon, hence requiring fewer individual parts to be installed or deinstalled. In addition, this creates a structural unit which handles both conveying and temperature control of the hydraulic fluid and of the fuel.

Temperature control of the fuel with simultaneous cooling of the hydraulic fluid, in particular oil, is achieved in an advantageous embodiment of the invention in that the heat exchanger for temperature control of coolant/lubricant conveyed by the hydraulic fluid pump and/or at least one hydraulic fluid return pump operates with a fuel conveyed by the low-pressure fuel pump and/or the high-pressure fuel pump, where the heat exchanger in particular is designed as a fuel-cooled oil cooler.

The heat exchanger can be designed in simple manner as a lamellar cooling device, a rib plate heat exchanger or the like. A heat exchanger of this type, designed for example with plates welded to one another, can be adjusted very easily to an outer contour of the pumps, so that an installation space required by the entire structural unit is very small and heat exchange is very efficient due to the adapted contours.

To achieve an efficient heat exchange in the area of the heat exchanger, the latter can be arranged substantially vertical to the shafts of the structural unit in a lateral rim area of the pumps and/or in an area on the circumferential side of at least one of the pumps and in particular enclose all pumps of the structural unit.

It is particularly advantageous when the heat exchanger is arranged in tubular or annular form around at least one pump. This permits an improved heat transfer and a further weight reduction, since an outer wall of the pumps can be used as an inner wall of the heat exchanger. In addition, the pumps can be shielded by a heat exchanger of this type from heat input from the outside.

If the heat exchanger is arranged at least partially in an area between one of the fuel pumps and one of the hydraulic fluid pumps, the fuel pumps and the hydraulic fluid pumps can be spatially separated from one another, so that a fuel circuit is safely separated from a hydraulic fluid circuit.

The pumps of the structural unit can be designed, depending on their application, as gear, spindle, rotary vane pumps or the like.

The features stated in the following exemplary embodiments of the structural unit in accordance with the invention are each suitable, singly or in any combination with one another, to develop the subject matter of the invention. The respective feature combinations do not represent any restriction with regard to the development of the subject matter in accordance with the invention, but have substantially only exemplary character.

Figure 3:
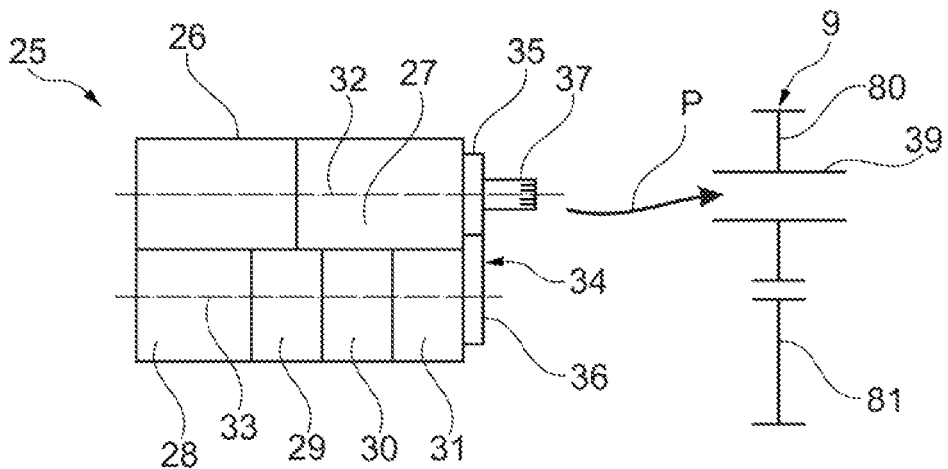
Figure 4:
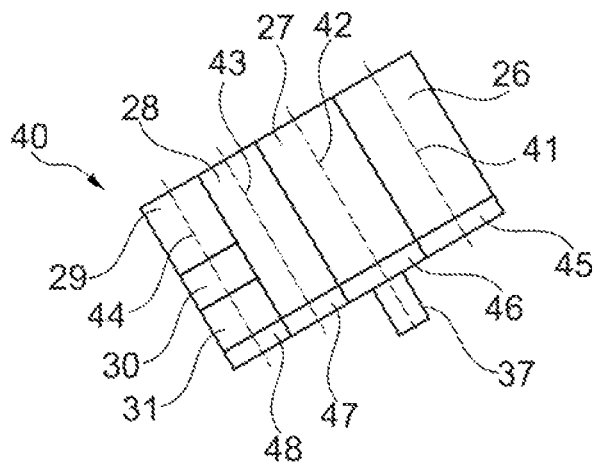
Figure 5:
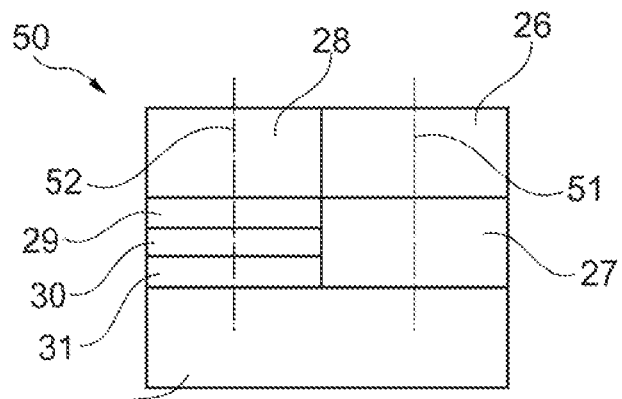
Figure 6:
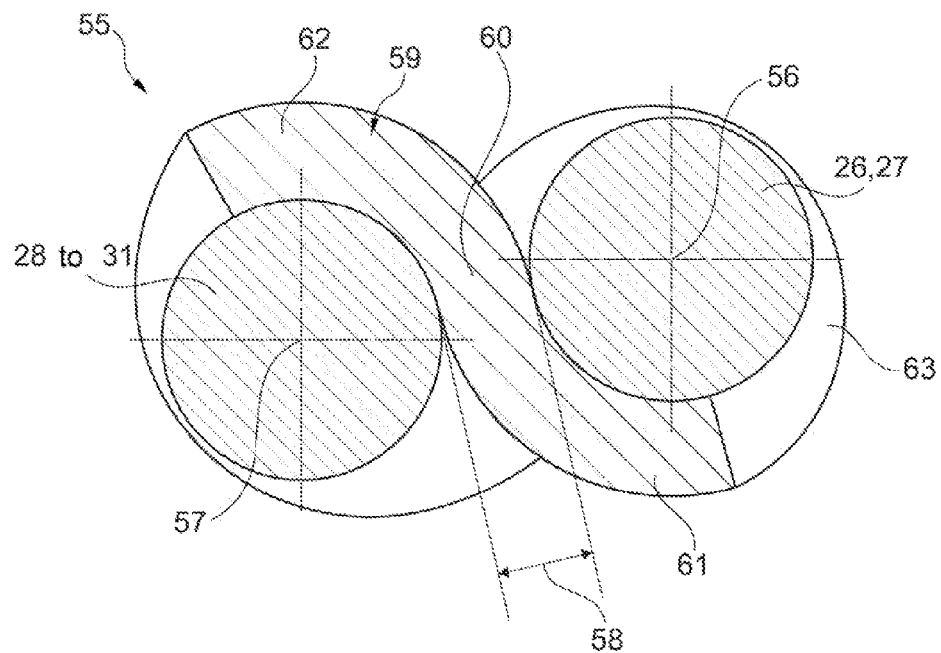
Figure 7:
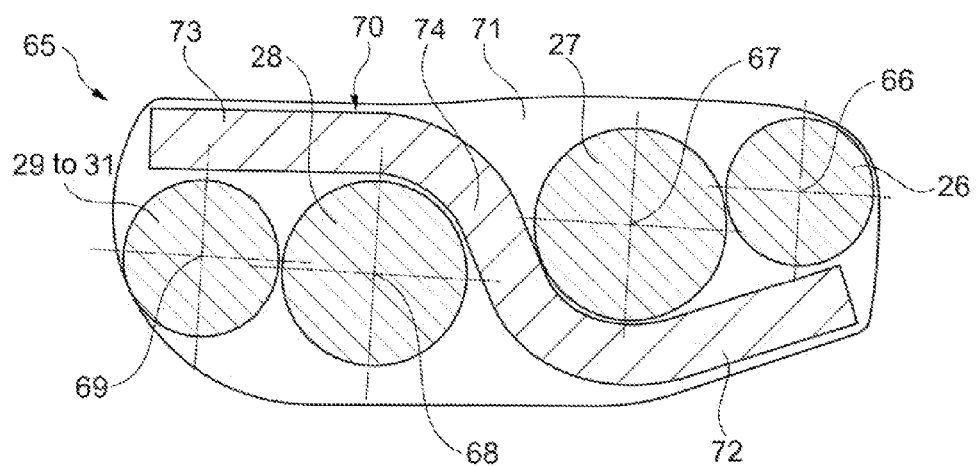

Further advantages and advantageous embodiments of the structural unit in accordance with the invention will become apparent from the exemplary embodiments described in principle in the following with reference to the accompanying drawing. In the drawing, FIG. 1 shows a highly schematized longitudinal sectional view of a jet engine featuring an accessory gearbox which can be coupled to a structural unit arranged in the area of an intermediate casing and which is arranged substantially in the area of an intermediate casing of the jet engine, FIG. 2 shows a highly schematized longitudinal sectional view of the jet engine as per FIG. 1 with an accessory gearbox which can be coupled to a structural unit arranged radially outside the bypass duct and which is arranged substantially radially outside a bypass duct of the jet engine, FIG. 3 shows a simplified representation of a first embodiment of the structural unit with fuel pumps and hydraulic fluid pumps in stand-alone position, FIG. 4 shows a simplified representation of a second embodiment of the structural unit in stand-alone position, FIG. 5 shows a highly schematized representation of a third embodiment of the structural unit in stand-alone position, FIG. 6 shows a schematic sketch of a fourth embodiment of the structural unit in stand-alone position, and FIG. 7 shows a highly simplified representation of a fifth embodiment of the structural unit in stand-alone position.

Figure 2:
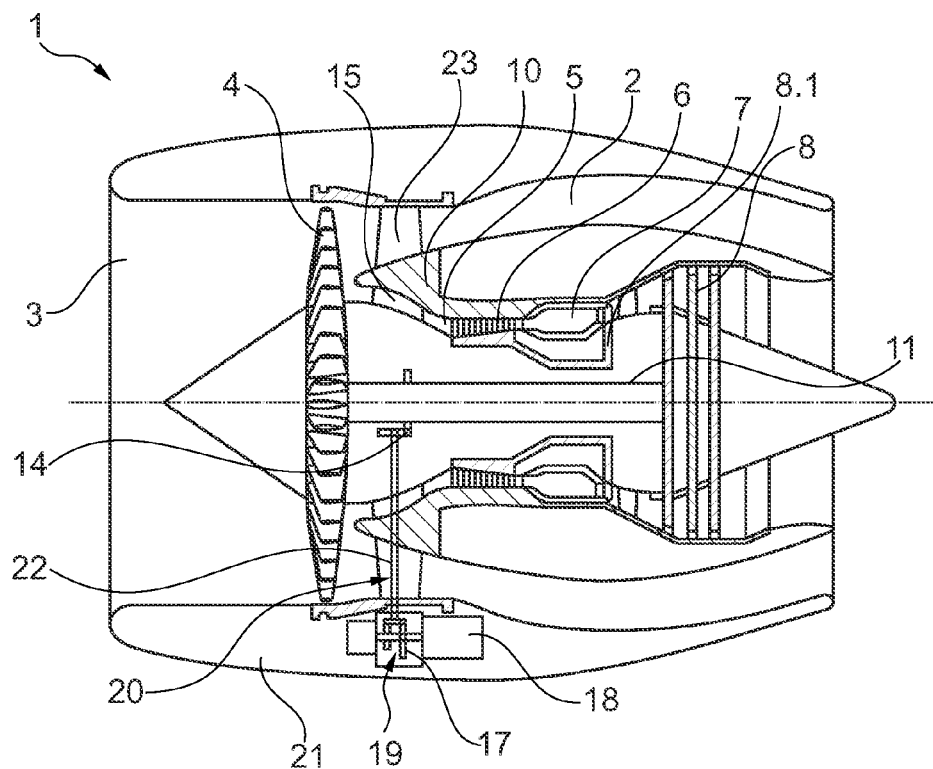

FIG. 1 and FIG. 2 each show a jet engine 1 of an aircraft with substantially identical design. The jet engine 1 is provided with a bypass duct 2 and an intake area 3. A fan 4 adjoins downstream the intake area 3 in a manner known per se.

Downstream of the fan 4, the fluid flow in the jet engine 1 splits into a bypass flow and a core flow, with the bypass flow flowing through the bypass duct 2 and the core flow into an engine core 5. The engine core 5 is designed in a manner known per se with a compressor device 6, a burner 7, a low-pressure turbine 8 intended for powering the fan 4 and a high-pressure turbine 8.1 intended for powering the compressor device 6.

FIG. 1 furthermore shows a schematically represented accessory gearbox 9, which is substantially arranged in the area of an intermediate casing 10 of the jet engine 1. The intermediate casing 10 is provided in the radial direction of the jet engine 1 in an area between engine core 5 and bypass duct 2.

The accessory gearbox 9 is driven by a drive shaft 12 interacting with an engine shaft 11 and which is arranged substantially parallel to said engine shaft 11 and can be put into operative connection with this engine shaft 11 in this case via an auxiliary shaft 13. The auxiliary shaft 13 is connected via a bevel gearing 14 to the engine shaft 11, where it interacts with a high-pressure shaft which in the operating state of the jet engine 1 rotates at a higher speed than a low-pressure shaft arranged coaxially thereto and linked to the fan 4.

Starting from the engine shaft 11, the auxiliary shaft 13 runs substantially in the radial direction of the jet engine 1 through a so-called inner strut 15, i.e. a strut designed with a hollow section outwards through the engine core 5 to the intermediate casing 10. In the area of the intermediate casing 10, the auxiliary shaft 13 interacts via a bevel gearing 16 with the drive shaft 12.

The drive shaft 12 is connected to accessory gearbox shafts of the accessory gearbox 9, not shown in greater detail and arranged substantially downstream of the intermediate casing 10, by gear pairings 17 of a gearbox 19 that are designed in particular as spur gear stages. The accessory gearbox shafts of the accessory gearbox 9 are arranged substantially parallel to the axis of the engine shaft 11 and positioned substantially adjacent to one another and spread in the circumferential direction of engine 1 in the area of the intermediate casing 10, i.e. in the radial direction between the bypass duct 2 and the engine core 5.

The accessory gearbox shafts are designed for interaction with auxiliary/secondary units 18, which can be designed for example as bleed unit, pneumatic starter, generator or the like and are driveable by the drive shaft 12 via the gear pairings 17 of the accessory gearbox 9.

In the embodiment of the jet engine 1 shown in FIG. 2, an alternatively designed accessory gearbox 20 is shown which is arranged substantially inside an area of a casing 21 arranged outside the bypass duct 2. A drive shaft 22 of the accessory gearbox 20 interacts here directly with the engine shaft 11 and extends, starting from the engine shaft 11, in the radial direction first through the inner strut 15, then through the intermediate casing 10 and finally through an outer strut 23.

One structural unit each can be coupled to the accessory gearbox shafts, and its various designs are described in greater detail in the following.

FIG. 3 shows a structural unit 25 which in this case is designed with a low-pressure fuel pump 26, a high-pressure fuel pump 27, an oil delivery pump 28 and three oil return pumps 29, 30, 31, where all pumps 26 to 31 in the exemplary embodiment are designed as rotary vane pumps.

The fuel pumps 26, 27 form part of a fuel circuit, where fuel is conveyed via the low-pressure fuel pump 26 to a heat exchanger arranged in this case outside the structural unit 25 and is cooled there before the fuel is raised by the high-pressure fuel pump 27 to a required supply pressure level. The oil pumps 28 to 31 form part of an oil circuit. The main delivery pump 28 provides a delivery pressure necessary for lubrication and cooling of various consumers inside the engine. The oil return pumps 29 to 31 return an oil volume collected in the area of the consumers, for example the gearbox 19, to a main tank of the oil circuit.

The structural unit 25 has two shafts 32, 33, where the fuel pumps 26, 27 are arranged together on a first shaft 32 and the oil pumps 28 to 31 together on a second shaft 33. The shafts 32, 33 are in turn coupled to one another via a gearbox 38 having a gear pairing 34 with a first gear 35 connected to the first shaft 32 and with a second gear 36 connected to the second shaft 33, so that the shafts 32 have a required gear transmission ratio to one another.

For connection of the structural unit 25 to an accessory gearbox shaft 39 of the accessory gearbox 9 shown only schematically in FIG. 3, a shaft area 37 arranged coaxially to the first shaft 32 and having external teeth is provided. The accessory gearbox shaft 39 is designed as a hollow shaft with internal teeth corresponding to the external teeth of the shaft area 37, so that the structural unit 25 shown in FIG. 3 at a distance from the accessory gearbox 9 can be brought into engagement with the accessory gearbox 9 by a movement in the direction of the arrow P. A gear 80 of the gearbox 19 that in turn engages with a gear 81 of the gearbox 19 that is in operative connection to the drive shaft 12 is arranged on the accessory gearbox shaft 39. The structural unit 25 can in this manner be easily and quickly connected to the hollow shaft 39 of the accessory gearbox 9 or detached therefrom.

The entire structural unit 25 is arranged inside a casing not shown in greater detail and attachable to/detachable from the accessory gearbox 9 as a complete unit.

FIG. 4 shows an alternatively designed structural unit 40, which unlike the structural unit 25 has four shafts 41, 42, 43, 44. On a first shaft 41 of the structural unit 40 the low-pressure fuel pump 26 is arranged, on a second shaft 42 the high-pressure fuel pump 27, on a third shaft 43 the oil delivery pump 28, and on a fourth shaft 44 the three oil delivery pumps 29 to 31 are arranged.

The shafts 41 to 44 are in turn operatively connected to one another by gears 45 to 48 assigned to the shafts 41 to 44 respectively and can be coupled to the accessory gearbox 9, 20 by the shaft area 37 assigned in this case to the second shaft 42.

A further embodiment of a structural unit 50 is shown in FIG. 5. In the highly schematized representation, the fuel pumps 26, 27 and the oil pumps 28 to 31 are arranged on separate shafts 51, 52 in analogous manner to the structural unit 25 in FIG. 3. In addition, FIG. 5 shows a heat exchanger 53 which is likewise arranged inside a casing of the structural unit 50 not shown in greater detail. The heat exchanger 53 is in this case designed as a lamellar cooling device and arranged substantially vertically to the shafts 51, 52 of the structural unit 50 in a lateral rim area of the pumps 26 to 31. The lamellar cooling device 53 emulates a shape of the substantially circular pumps 26 to 31 and has a shape substantially similar to two connected circles.

FIG. 6 shows a further embodiment of a structural unit 55 designed with two shafts 56, 57, where the fuel pumps 26, 27 are arranged on a first shaft 56 and the oil pumps 28 to 31 on a second shaft 57. There is a space 58 between the fuel pumps 26, 27 and the oil pumps 28 to 31 transversely to the direction of extent of the shafts 56, 57. The structural unit 55 has a plate-like rib plate heat exchanger 59 which passes through the space 58 between the pumps 26 to 31 substantially vertically in the sectional view and almost complete fills this space. The area 60 of the heat exchanger 59 filling the space 58 is adjacent at one end to an area 61 which in this case contacts approximately over a quarter-circle an outer wall of the fuel pumps 26, 27. At the other end, the area 60 is adjacent to a further area 62 which in this case contacts approximately over a quarter-circle an outer wall of the oil pumps 28 to 31. The heat exchanger 59 thus has an S-shaped cross-section. The heat exchanger 59 and the pumps 26 to 31 arranged on the shafts 56, 57 are arranged overall inside a casing 63 of the structural unit 55.

FIG. 7 shows a structural unit 65 similar to the structural unit 40 in FIG. 4 with pumps 26 to 31 arranged on four shafts 66 to 69, where a rib plate heat exchanger 70 is provided which has an S-shaped cross-section and, in analogous manner to the heat exchanger 59 of the structural unit 55, passes between a shaft 67 having the high-pressure fuel pump 27 and a shaft 68 having the oil delivery pump 28, thereby separating the fuel pumps 26, 27 from the oil pumps 28 to 31. The heat exchanger 70 has in the sectional view two legs 72, 73, where a first leg 72 interacts with an outer wall of the fuel pumps 26, 27 and a second leg 73 with an outer wall of the oil pumps 28 to 31 each. The legs 72, 73 are designed substantially straight and are connected to one another by an area 74 passing between the high-pressure fuel pump 27 and the oil delivery pump 28. The heat exchanger 70, which is also designed plate-like, the shafts 66 to 69 and the pumps 26 to 31 are in turn arranged inside a common casing 71.

The above embodiments are described only as examples for a number of possible combinations. For example, the structural unit can have only one fuel pump 26 or 27. Similarly, the structural unit can have only the oil delivery pump 28 or one or more oil return pumps 29 to 31. All elements of the structural units 25, 40, 50, 55 and 65 described in the above can be combined with one another as required.

LIST OF REFERENCE NUMERALS

1 Jet engine
2 Bypass duct
3 Intake area
4 Fan
5 Engine core
6 Compressor device
7 Burner
8 Low-pressure turbine
8.1 High-pressure turbine
9 Accessory gearbox
10 Intermediate casing
11 Engine shaft
12 Drive shaft
13 Auxiliary shaft
14 Bevel gearing
15 Inner strut
16 Bevel gearing
17 Gear pairings
18 Auxiliary unit
19 Gearbox
20 Accessory gearbox
21 Casing
22 Drive shaft 23 Outer strut
25 Structural unit
26 Low-pressure fuel pump
27 High-pressure fuel pump
28 Oil delivery pump
29 to 31 Oil return pumps
32 First shaft
33 Second shaft
34 Gear pairings
35 First gear
36 Second gear
37 Shaft area
38 Gearbox
39 Accessory gearbox shaft
40 Structural unit
41 First shaft
42 Second shaft
43 Third shaft
44 Fourth shaft
45 to 48 Gear
50 Structural unit
51 First shaft
52 Second shaft
53 Heat exchanger
55 Structural unit
56 First shaft
57 Second shaft
58 Space
59 Rib plate heat exchanger
60 to 62 Area of rib plate heat exchanger
63 Casing
65 Structural unit
66 to 69 Shaft
70 Rib plate heat exchanger
71 Casing
72 First leg of rib plate heat exchanger
73 Second leg of rib plate heat exchanger
74 Area
80, 81 Gear
P Arrow

What is claimed is:

1. A structural unit for an aircraft engine, comprising:
at least one fuel pump of a fuel circuit, and
at least one hydraulic fluid pump of a hydraulic fluid circuit,
a single coupling for coupling the structural unit directly to one of a plurality of accessory gearbox shafts of an accessory gearbox driven by a drive shaft of the engine, the accessory gearbox housing the plurality of accessory gearbox shafts extending in a circumferential direction of the engine, the accessory gearbox shafts arranged substantially parallel to an axis of the engine, with one of the plurality of accessory gearbox shafts being driven directly by the drive shaft and a remainder of the plurality of accessory gearbox shafts being driven indirectly by the drive shaft via the one of the plurality of accessory gearbox shafts being driven directly by the drive shaft;
a common casing disposed within a nacelle;
wherein the at least one fuel pump and the at least one hydraulic pump are both drivingly connected to the single coupling and are both driven by a power transmission from the accessory gearbox shaft through the single coupling;
wherein the at least one fuel pump and the at least one hydraulic fluid pump are arranged inside the common casing and the common casing directly supports the at least one fuel and the at least one hydraulic fluid pump.

2. The structural unit in accordance with claim 1, wherein the at least one fuel pump includes a low-pressure fuel pump and a high-pressure fuel pump which are arranged on a common shaft of the structural unit.

3. The structural unit in accordance with claim 1, wherein the at least one hydraulic fluid pump includes a hydraulic fluid delivery pump and at least one hydraulic fluid return pump which are arranged on a common shaft of the structural unit.

4. The structural unit in accordance with claim 1, wherein the at least one hydraulic fluid pump includes a hydraulic fluid delivery pump and at least one hydraulic fluid return pump arranged on separate shafts of the structural unit which are parallel to one another.

5. The structural unit in accordance with claim 4, and further comprising a gearbox including at least one gear stage coupling separate shafts of the structural unit to one another.

6. The structural unit in accordance with claim 1, wherein the single coupling includes a shaft area having external teeth for coupling to the accessory gearbox shaft.

7. The structural unit in accordance with claim 1, and further comprising a heat exchanger forming part of the structural unit and integrated into a casing of the structural unit.

8. The structural unit in accordance with claim 7, wherein the heat exchanger is thermally connected to at least one chosen from the fuel circuit and the hydraulic fluid circuit for temperature control of fluid in the at least one chosen from the fuel circuit and the hydraulic fluid circuit.

9. The structural unit in accordance with claim 7, wherein the heat exchanger is at least one chosen from a lamellar cooling device and a rib plate heat exchanger.

10. The structural unit in accordance with claim 7, wherein the heat exchanger is arranged substantially vertical to shafts of the structural unit in a lateral rim area of the pumps in the axial direction of the shafts.

11. The structural unit in accordance with claim 7, wherein the heat exchanger is arranged in an area on a circumferential side of at least one of the pumps.

12. The structural unit in accordance with claim 7, wherein the heat exchanger is arranged in tubular or annular form around at least one pump.

13. The structural unit in accordance with claim 7, wherein the heat exchanger is arranged at least partially in an area between the at least one fuel pump and the at least one hydraulic fluid pump.

14. The structural unit in accordance with claim 1, wherein at least one chosen from the at least one fuel pump and the at least one hydraulic fluid pump is at least one chosen from a gear pump, a spindle pump, and a rotary vane pump.

* * * * *